United States Patent Office 3,477,990
Patented Nov. 11, 1969

3,477,990
PROCESS FOR REACTING A PHENOL WITH AN EPOXY COMPOUND AND RESULTING PRODUCTS
Mark F. Dante, Madison, and Harvey L. Parry, Summit, N.J., assignors to Shell Oil Company, New York, N.Y., a corporation of Delaware
No Drawing. Filed Dec. 7, 1967, Ser. No. 688,673
Int. Cl. C08g *23/10, 23/14*
U.S. Cl. 260—47                                13 Claims

ABSTRACT OF THE DISCLOSURE

A process for reacting a phenol with an epoxy-containing compound is disclosed. This process comprises reacting an epoxide having more than one 1,2-epoxide group with a phenol in the presence of a phosphonium halide catalyst. The products resulting from this process are also disclosed.

---

This invention relates to a new process for reacting a phenol with an epoxy-containing compound and to the resulting products. More particularly, the invention relates to a new process for effecting a specific reaction between compounds possessing a 1,2-epoxide group and a phenolic OH group, and to the improved products obtained thereby.

Specifically, the invention provides a new and highly efficient process for effecting a reaction between epoxy-containing compounds and compounds containing phenolic OH groups which reduces or eliminates side reactions and gives high yields of the desired hydroxy ethers. The new process comprises reacting a compound containing at least one and preferably more than one 1–2 epoxide group, such as, for example, a glycidyl polyether of a polyhydric phenol, with a phenol possessing at least one and preferably two or more phenolic OH groups, such as, for example, 2,2-bis(4-hydroxyphenyl)propane in the presence of a phosphonium halide catalyst. The invention further provides new and improved products prepared by the above process.

As a special embodiment, the invention provides a new process for preparing high molecular weight polyepoxide resins which comprises reacting a polyepoxide, such as the above-noted glycidyl polyethers of polyhydric phenols, with controlled proportions of a polyhydric phenol in the presence of the phosphonium halide catalysts.

Epoxy compounds are known to react with phenolic OH groups to form phenolic hydroxy ethers. This reaction can be used to produce a variety of valuable compounds, polymers and resins. The catalysts used for this reaction heretofore have been inorganic bases or tertiary amines which are also effective catalysts for competing reactions of epoxides with alcoholic OH groups, homo-polymerization of epoxy groups and the like. As a result, the product obtained is a mixture of polymers and resins which contain varying degrees of molecular weight, chain branching and end group functionality. Such a composition detracts from the performance and utility of the said product.

It is an object of this invention, therefore, to provide a new process for reacting epoxy compounds with phenols. It is a further object to provide a new process for reacting epoxy compounds with phenols which effects a clean reaction without side reactions. It is a further object to provide a new process for reacting epoxy compounds with phenols which gives the desired phenolic hydroxyl ethers in high yield and purified form, and free of undesired branching and non-functional terminations. It is a further object to provide a process for preparing essentially linear high molecular weight resins which are ketone soluble from polyepoxides and polyhydric phenols. It is a further object to provide a process for preparing new polyepoxides in high yield and purified form from low molecular weight polyepoxides and phenols. It is a further object to provide a new process for preparing brominated resins having improved flame resistance from polyepoxides and brominated phenols. These and other objects of the invention will be apparent from the following detailed description thereof.

It has now been discovered that these and other objects of the invention may be accomplished by the process of the invention which comprises reacting a compound containing at least one and preferably more than one vic-epoxy group with a phenol possessing at least one and preferably two or more phenolic OH groups, such as, for example, 2,2-bis(4-hydroxyphenyl)propane, in the presence of a phosphonium halide catalyst. It has been unexpectedly found that these particular compounds catalyze the reaction between the epoxy group and phenolic OH group and is specific thereto without having effect on the reaction of alcoholic OH group and epoxy group and/or the homopolymerization of the epoxy groups. As a result, one obtains the desired phenolic hydroxy ether in very high yields and purified form. The process has been found to be particularly good for forming essentially linear high molecular weight ketone soluble polymers and resins from the polyepoxides and polyhydric phenols as noted in the working examples at the end of the specification.

In addition to their use as catalysts in the preparation of phenolic hydroxy ethers, the phosphonium halides possess the unexpected property of retaining their catalytic activity for prolonged periods when dissolved in an epoxide as noted in the working examples at the end of the specification. This makes it possible to prepare shelf-stable precatalyzed epoxides, to which only the phenol has to be added for preparing the desired phenolic hydroxy ethers.

The process of the invention involves the reaction of any epoxy compounds and any phenol to form the desired phenolic hydroxy ether

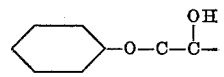

The epoxy compounds used are those possessing at least one 1,2-epoxide group, i.e., a

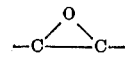

group. They may be monoepoxides or polyepoxides. The monoepoxides may be aliphatic or cycloaliphatic or heterocyclic and may be saturated or unsaturated. They may also be substituted with aromatic rings, ether groups, halogen atoms, ester groups, and the like. Examples of the monoepoxides include, among others, styrene oxide, phenyl glycidyl ether, allyl glycidyl ether, octadecyl glycidyl ether, amyl glycidyl ether, tolyl glycidyl ether, chlorophenyl glycidyl ether, naphthyl glycidyl ether, diacetate of monoglycidyl ether of glycerol, dipropionate of the monoglycidyl ether of glycerol, diacrylate of the monoglycidyl ether of glycerol, 1,2-hexylene oxide, ethylene oxide, propylene oxide, 1-heptylene oxide, 3-ethyl-1,2-pentylene oxide, glycidyl acetate, glycidyl benzoate, glycidyl propionate, glycidyl acrylate, glycidyl allyl phthalate, glycidyl methyl maleate, glycidyl stearate, glycidyl deate, methyl 1,2-epoxypropionate, butyl 1,2-epoxypropionate, and the like.

Preferred monoepoxides to be used include the monoepoxy-substituted hydrocarbons, such, as for example, the alkylene oxides containing up to 12 carbon atoms, the epoxy-substituted hydrocarbons, such as, for example, bons as epoxy cyclohexane, epoxypropylbenzene, and the like; the monoepoxy substituted alkyl ethers of hydrocarbon monohydric alcohols or phenols, such as, for example, the glycidyl ethers of aliphatic, cycloaliphatic and aromatic hydrocarbon alcohols containing up to 12 carbon atoms; the monoepoxy-substituted alkyl esters of hydrocarbon monocarboxylic acids, such as, for example, the glycidyl esters of aliphatic, cycloaliphatic and aromatic hydrocarbon acids, as glycidyl acrylate, glycidyl caprolate, glycidyl benzoate, and the like; the monoepoxy-substituted alkyl esters of hydrocarbon polycarboxylic acids wherein the other carboxyl group or groups are esterified with alkanols, such as, for example, glycidyl esters of phthalic acid, maleic acid, isophthalic acid, succinic acid and the like, wherein each contains up to 15 carbon atoms; alkyl and alkenyl esters of epoxy-substituted monocarboxylic acids, such as esters of 1,2-epoxypropionic acid, epoxy butyric acid and epoxy pentanoic acid; epoxyalkyl ethers of polyhydric alcohols wherein the other OH groups are esterified or etherified with hydrocarbon acids or alcohols, such as, for example, monoglycidyl ethers of aliphatic, cycloaliphatic polyhydrice alcohols and polyhydric phenols, each containing no more than 15 carbon atoms; and monoesters of polyhydric alcohols and polyhldric phenols, each containing the other OH groups are esterified or etherified with hydrocarbon acids or alcohols, each containing no more than 15 carbon atoms.

Coming under special consideration, particularly because of the superior properties of the resulting hydroxy-substituted products are those monoepoxides which contain halogen atoms, and specially a plurality of chlorine atoms, such as epichlorohydrin, pentachlorophenyl glycidyl ether, hexachlorocyclohexyl glycidyl ether and the like.

Especially preferred are monoepoxides of the formula

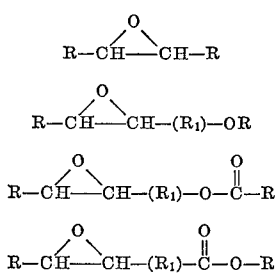

wherein R is hydrogen, a hydrocarbon or halogenated hyrocarbon radical and $R_1$ is a bivalent hydrocarbon or halogenated bivalent hydrocarbon radical, preferably containing 1 to 12 carbon atoms.

The polyepoxides used in the process of the invention comprise those compounds possessing more than one 1,2-epoxide group. These polyepoxides may be saturated or unsaturated, aliphatic, cycloaliphatic, aromatic or heterocyclic and may be substituted if desired with non-interfering substituents, such as halogen atoms, phosphorus atoms, hydroxyl groups, ether radicals, and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0.

Various examples of polyepoxides that may be used in the invention are given in U.S. 2,633,458 and it is to be understood that so much of the disclosure of that patent relative to examples of polyepoxides is incorporated by reference into this specification.

Other examples include the glycidyl ethers of novolac resins, i.e., phenol-aldehyde condensates. Preferred resins of this type are those of the formula:

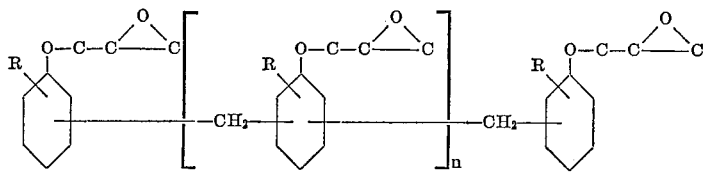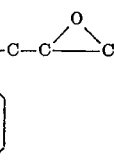

wherein R is hydrogen or an alkyl radical and $n$ is an integer of 1 to about 10. Preparation of these polyepoxides is illustrated in U.S. 2,216,099 and U.S. 2,658,885.

Other examples include the epoxidized esters of the polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecandienoate, butyl 9,12,15-octadecatrienoate, butyl eleostearate, mono or diglycerides of tung oil, fatty acids, monoglycerides of soybean oil, sunflower, rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, digylcidyl phthalate, diglycidyl adipate, diglycidyl isophthalate, di(2,3-epoxybutyl)adipate, di(2,3-epoxybutyl)oxalate, di(2,3-epoxyhexyl)succinate, di(3,4-epoxybutyl)maleate, di(2,3-epoxyoctyl)pimelate, di(2,3-epoxybutyl)phthalate, di(2,3-epoxyoctyl)tetrahydrophthalate, di(4,5-epoxydodecyl) maleate, di(2,3-epoxybutyl)terephthalate, di(2,3-epoxypentyl)thiodipropionate, di(5,6 - epoxytetradecyl)diphenyldicarboxylate, di(3,4-epoxyheptyl)sulfonyldibutyrate, tri(2,3-epoxybutyl)1,2,4-butanetricarboxylate, di-(5,6-epoxypentadecyl) tartarate, di(4,5-epoxytetradecyl) maleate, di(2,3-epoxybutyl)azelate, di(3,4-epoxybutyl) citrate, di(5,6-epoxyoctyl)cyclohexane-1,3-dicarboxylate, di(4,5-epoxyoctadecyl)malonate.

Another group of the epoxy-containing materials include those epoxidized esters of unsaturated alcohols and unsaturated carboxylic acids, such as glycidyl glycidate, 2,3-epoxybutyl 3,4-epoxypentanoate; 3,4-epoxy-hexyl, 3, 4-epoxypentanoate; 3,4-epoxycyclohexyl 3,4-epoxycyclohexyl methyl epoxycyclohexane carboxlate.

Still another group of the epoxy-containing materials include epoxidized derivatives of polyethylenically unsaturated polycarboxylic acids, such as, for example, dimethyl 8,9,12,13-diepoxyeiconsanedioate; dibutyl 7,8,11, 12-diepoxyoctadecanedioate; dioctyl 10,11-diethyl-8,9,12, 13-diepoxyeicosanedioate; dihexyl 6,7,10,11-diepoxyhexadecanedioate; didecyl 9-epoxyethyl-10,11-epoxyoctadecanedioate; dibutyl 3-butyl-3,4,5,6-diepoxycyclohexane-1,2-dicarboxylate; dicyclohexyl 3,4,5,6-diepoxycyclohexane-1,2-dicarboxylate; dibenzyl 1,2,4,5-diepoxycyclohexane-1,2-dicarboxylate and diethyl 5,6,10,11-diepoxyoctadecyl succinate.

Still another group comprises the epoxidized polyethyl-obtained by reacting an unsaturated polyhydric and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

The phenols used in the process of the invention are those compounds possessing at least one OH group attached to an aromatic nucleus. The phenols may be monohydric or polyhydric and may be substituted with a great variety of different types of substituents. Examples of the phenols include among others, phenol, resorcinol, o-cresol, m-cresol, p-cresol, carvacrol, thymol, chlorophenol, nitrophenol, dinitrophenol, picric acid, pyrocatechol, hydroquinone, pyrogallol, hydroxyhydroquinone, phloroglucinol, 2,2-bis(4-hydroxyphenyl)propone, 2,2-bis(4-hydroxyphenyl)pentane, 2,2-bis(4 - hydroxyphenyl) phloroglucinol, 2,2-bis(4-hydroxyphenyl)propane, 2,2-bis(4-hydroxyphenyl)methane, 2-methoxyphenol, 2,4-dibutoxyphenol, 2,5-dicholorphenol, 3-acetoxphenol, 2,2-bis(3-allyl-4-hydroxyphenyl)propane, 2,2-bis(3-isobutyl-4-hydroxyphenyl)pentane, 1,1,2,2 - tetrakis(4 - hydroxyphenyl) ethane, 1,1,4-4-tetrakis(4-hydroxyphenyl)pentane and the like, and polymeric type polyhydric phenols obtained by condensing monohydric or polyhydric phenols with formaldehyde, as well as phenols of the formulae

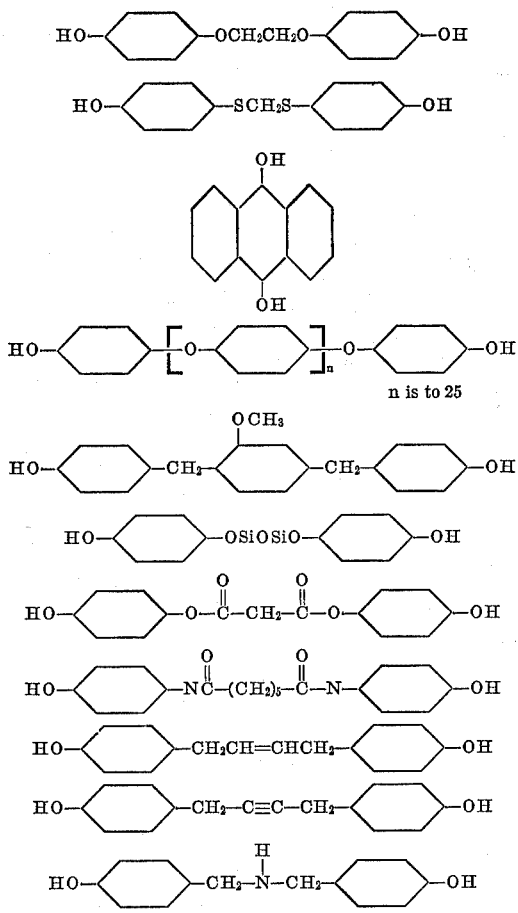

n is to 25

Preferred phenols to be used are the polyhydric phenols containing from 2 to 6 OH groups and up to 30 carbon atoms. Coming under special consideration are the phenols of the formula

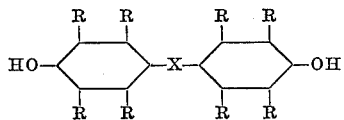

wherein X is a polyvalent element or radical and R is a member of the group consisting of hydrogen, halogen and hydrocarbon radicals. The preferred elements or radicals represented by X are oxygen, sulfur, —SO—, —SO$_2$—, bivalent hydrocarbon radicals containing up to 10 carbon atoms, and oxygen, sulfur and nitrogen-containing hydrocarbon radicals, such as —ORO—, —ORORO—, —S—R—S—,
—S—R—S—R—S, —OSiO—, —OSiOSiO—, $$-O-\overset{O}{\underset{}{C}}R-\overset{O}{\underset{}{C}}-O-, \quad -\overset{O}{\underset{}{C}}-O-R-O-\overset{O}{\underset{}{C}}-, \quad -\overset{O}{\underset{}{S}}-R-\overset{O}{\underset{}{S}}-$$

—SO$_2$—R—SO$_2$— radicals wherein R is a bivalent hydrocarbon radical.

The catalyst used for the process of the invention is a phosphonium halide. Preferred phosphonium halides are those conforming to the formula

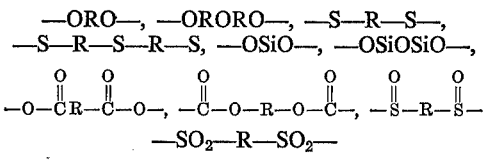

wherein X is a halogen atom, and $R_1$, $R_2$, $R_3$ and $R_4$ are the same or different and represent hydrocarbon residues which may or may not be substituted by one or more functional groups, such as halogen atoms. These phosphonium halides may generally be prepared by mixing in approximately equimolar proportions a phosphine with a halide. The mixing may be carried out with or without the application of heat, alone or in the presence of an inert solvent such as, for example, diethylether, benzene, chloroform or carbon tetrachloride.

Preferred phosphines are the organic phosphines, i.e., compounds of the formula

P(R)$_3$ wherein at least one R is an organic radical and the other R's are hydrogen or organic radicals and preferably hydrocarbon radicals or substituted hydrocarbon radicals which may contain no more than 25 carbon atoms. Examples of the phosphines include triphenyl phosphine, tributyl phosphine, trilauryl phosphine, tricyclohexyl phosphine, trihexyl phosphine, triallyl phosphine, tridodecyl phosphine, trieicosadecyl phosphine, trichlorobutyl phosphine, triethoxybutyl phosphine, trihexenyl phosphine, trixylyl phosphine, trinaphthyl phosphine, tricyclohexenyl phosphine, tri(3,4-diethyloctyl)phosphine, trioctadecyl phosphine, dioctyldecyl phosphine, dicyclohexyl phosphine, dibutyl allyl phosphine and the like, and mixtures thereof.

Particularly preferred phosphines to be employed include the trihydrocarbyl, dihydrocarbyl and monohydrocarbyl phosphines wherein the hydrocarbyl radicals (hydrocarbon radicals) contain from 1 to 18 carbon atoms, and more particularly those wherein the hydrocarbon radicals are alkyl, cycloalkyl, alkenyl, cycloalkenyl, aryl, alkaryl, arylalkyl, and the like radicals. Coming under special consideration are the phosphines containing at least one and preferably three aromatic radicals.

Compounds to be mixed with the phosphine in the preparation of the phosphonium halide cataylst include organic halides.

Preferred organic halides are those wherein the organic radical is a hydrocarbon radical, preferably having from 1 to 10 carbon atoms. Examples of preferred organic halides include methylchloride, ethyl chloride, methyl bromide, ethyl bromide, methyl iodide, ethyl iodide, propyl iodide, n-butyl iodide, sec-butyl iodide and n-decyl iodide.

Examples of the above-noted phosphonium catalysts include, among others, methyl triphenyl phosphonium iodide, ethyl triphenyl phosphonium iodide, propyl triphenyl phosphonium iodide, n-butyl triphenyl phosphonium iodide, iso-butyl triphenyl phosphonium iodide, sec-butyl triphenyl phosphonium iodide, n-pentyl triphenyl phosphonium iodide, n-decyl triphenyl phosphonium iodide, methyl tributyl phosphonium iodide, ethyltributyl phosphonium iodide, propyl tributyl phosphonium iodide, methyl triphenyl phosphonium chloride, ethyl triphenyl phosphonium chloride, propyl tributyl phosphonium iodide, n-butyl triphenyl phosphonium chloride and ethyl triphenyl phosphonium bromide.

To illustrate the way in which these phosphonium catalysts are prepared, an example is given for the preparation of ethyl triphenyl phosphonium iodide. 52 gr. of triphenyl phosphine was dissolved in 100 ml. benzene and 32 gr. of ethyl iodide was added slowly. The mixture was refluxed for 4 hours and then the white precipitate was filtered off and dried. 63 gr. of ethyl triphenyl phosphonium iodide was obtained having a melting point of 161–162° C.

The amount of the epoxide and the phenol to be employed in the process may vary over a wide range depending upon the type of reactants and the type of product to be desired. In general, these reactants are used in approximately chemical equivalent amounts, i.e., a chemical equivalent amount of the phenol will be that sufficient to furnish one phenolic OH for every epoxy group to be reacted. For example, if one is reacting a diepoxide with a monohydric phenol and both epoxy groups are to be reacted, one mole of diepoxide should be reacted with about two moles of the monohydric phenol. On the other hand, if one is reacting a diepoxide with a dihydric phenol and a monomer product is desired by reacting both epoxide groups, one should react one mole of the diepoxide with about 2 moles of the polyhydric phenol. If a polymeric product is desired smaller ratios should be utilized as desired, such as, for example, 4 moles of the diepoxide and 5 moles of the polyhydric phenols.

Superior results of the new process are obtained when the higher molecular weight resins are obtained and in this case the ratios of reactants are varied depending upon the molecular weight desired and upon the type of end groups, i.e., whether the product is to be terminated with an epoxide or with a phenol. The production of such higher molecular weight product is illustrated in the examples at the end of the specification.

The amount of the phosphonium catalyst will vary over a wide range. In general, amount of catalyst will vary from about .001% to about 10% by weight, and more preferably from about 0.05% to about 5% by weight of the reactants.

The reaction may be conducted in the presence or absence of solvents or diluents. In most cases, the reactants will be liquid and the reaction may be easily effected without the addition of solvents or diluents. However, in some cases, whether either or both reactants are solids or viscous liquids it may be desirable to add diluents to assist in effecting the reaction. Examples of such materials include the inert liquids, such as inert hydrocarbons as xylene, toluene, cyclohexane and the like.

If solvents are employed in the reaction and the resulting product is to be used for coating purposes, the solvent may be retained in the reaction mixture. Otherwise, the solvent can be removed by any suitable method such as by distillation and the like. Unlike inorganic bases or amines, it is not necessary to remove the phosphonium catalysts. This is an advantage as shown by Example IV.

The products obtained by the above process will be the desired phenolic hydroxy ether compounds. Their physical characteristics will depend upon the desired reactants and proportions. In general, the products will vary from liquids to solids, and in the case of the high molecular weight resins will vary from viscous liquids to hard solids. The products will possess at least one alcoholic OH group formed by each reaction of the epoxide and phenol OH group, and can be further reacted through this group or groups. The polyfunctional reactants will also give products terminated in phenolic OH groups and/or epoxy groups, and these will be available for further reaction.

A group of products which are particularly outstanding are those resins and polymers obtained by the reaction of the polyepoxides and polyhydric phenols in controlled proportions. Those which use an excess of the polyepoxide will be terminated in epoxy groups and can be used as polyepoxides in known reactions of polyepoxides with curing agents and the like. The new high molecular weight polyepoxides are particularly useful in preparing surface coatings, adhesive, laminates, filament windings, coatings for highways and airfields, structural applications, formation of foams and the like. Those prepared from the halogenated polyhydric phenols as shown hereinafter are particularly useful as flame proofing resins for forming laminates, coatings and the like.

As noted, the new polyepoxides can be reacted with curing agents to form hard insoluble infusible products. The curing agents for the products include materials which are preferably acidic or alkaline. Examples of suitable curing agents include among others, the polybasic acids and their anhydrides, such as, for example, the di, tri- and higher carboxylic acids as oxalic acid, phthalic acid, terphthalic acid, succinic acid, alkyl and alkenyl-substituted succinic acids, tartaric acid, and partiularly the polymerized unsaturated acids, such as, for example, those containing at least 10 carbon atoms, and preferably more than 14 carbon atoms, as for instance dodecenedioic acid, 10,12-eicosadienedioic acid, and anhydrides as phthalic anhydride, succinic anhydride, malic anhydride, nadic anhydride, pyromellitic anhydride and the like.

Other types of acids that are useful are those containing sulfur, N, phosphorus or halogens; chloridic acid, benzene phosphonic, sulfonyl dipropionic acid bis(4-carboxyphenyl)amide.

Other preferred curing agents include the amino-containing compounds, such as, for example, diethylene triamine, triethylene tetramine, dicyandiamide, melamine, pyridine, cyclohexylamine, benzyldimethylamine, benzylamine, diethylaniline, triethanolamine, piperidine, tetramethylpiperamine, N,N-dibutyl-1,3-propane diamine, N,N-diethyl-1,3-propane diamine, 1,2-diamino-2-methylpropane, 2,3-diamino - 2 - methylbutane, 2,3-diamino-2-methylpentane, 2,4-diamino-2,6-dimethyloctane, dibutylamine, dioctylamine, dinonylamine, distearylamine, diallylamine, dicyclohexylamine, methylethylamine, ethylcyclohexylamine, pyrrolidine, 2-methylpyrrolidine, tetrahydropyridine, 2-methylpiperidine, 2,6-dimethylpiperidine, diaminopyridine, tetramethylpentane, meta-phenylene diamine and the like, and soluble adducts of amines and polyepoxides and their salts, such as described in U.S. 2,651,589 and U.S. 2,640,037. Still other examples include the acetone soluble reaction products of polyamines and monoepoxides, the acetone soluble reaction products of polyamines with unsaturated nitriles, such as acrylonitrile, imidazoline compounds as obtained by reaction monocarboxylic acids with polyamines, sulfur and/or phosphorus-containing polyamines as obtained by reacting a mercaptan or phosphine containing active hydrogen with an epoxide halide to form a halohydrin, dehydrochlorinating and then reacting the resulting product with a polyamine, soluble reaction product of polyamines with acrylates, and many other types of reaction products of the amines.

Still other curing agents that may be used include boron trifluoride and complexes of boron trifluoride with amines, ethers, phenols and the like, Friedel Crafts metal salts, such as aluminum chloride, zinc chloride, and other salts, such as zinc fluoborate, magnesium perchlorate and zinc fluosilicate; inorganic acids and partial esters as phosphoric acid and partial esters thereof including n-butyl orothiophosphate, diethyl orthophosphate and hexaethyltetraphosphate and the like.

Another type of curing agent to be employed includes the polyamides containing active amino and/or carboxyl groups, and preferably those containing a plurality of amino hydrogen atoms. Examples of polybasic materials used in making these polyamides include, among others, 1,10-decanedioic acid, 1,12-dodecanedienedioic acid, 1,20-eicosadienedioic acid, 1,14-tetradecanedioic acid, 1,18-octadecanedioic acid and dimerized and trimerized fatty acids as described above. Amines used in making the polyamides include preferably the aliphatic and cycloaliphatic polyamines as ethylene diamine, diethylene triamine, triethylene tetramine, tetraethylene pentamine, 1,4-diaminobutane, 1,3-diaminobutane, hexamethylene diamine, 3-(N-isopropylamino)propylamine and the like. Especially preferred polyamides are those derived from the aliphatic polyamides containing no more than 12 carbon atoms and polymeric fatty acids obtained by dimerizing and/or trimerizing ethylenically unsaturated fatty acids containing up to 25 carbon atoms. These preferred polyamides have a viscosity between 10 and 750 poises at 40° C., and preferably 20 to 250 poises at 40° C. Preferred polyamides also have amine values of 50 to 450.

Still another group of curing agents are those based on melamine reaction products containing methylol substituents.

The amount of curing agent may vary considerably depending upon the particular agent employed. For the alkalies or phenoxides, 1% to 4% is generally suitable. With phosphoric acid and esters thereof, good results are obtained with 1 to 10% added. The tertiary amine compounds are preferably used in amounts of about 1% to 15%. The acids, anhydrides, polyamides, polyamines, polymercaptans, etc. are preferably used in at least 0.8 equivalent amounts, and preferably 0.8 to 1.5 equivalent amounts. An equivalent amount refers to that amount needed to give one active H (or anhydride group) per epoxy group.

Solvents or diluents may also be added to make the composition more fluid or sprayable. Preferred solvents or diluents include those which are volatile and escape from the polyepoxide composition before or during cure such as esters as ethyl acetate, butyl acetate, Cellosolve acetate (ethylene glycol monoacetate), methyl Cellosolve acetate (acetate ethylene glycol monomethyl ether), etc., ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc. and/or alcohols such as ethyl, isopropyl or n-butyl alcohol. Solvents which remain in the cured compositions may also be used, such as diethyl phthalate, dibutyl phthalate and the like, as well as cyano-substituted hydrocarbons, such as acetonitrile, propionitrile adiponitrile, benzonitrile, and the like. It is also convenient to employ normally liquid glycidyl compounds, glycidyl cyclopentyl ether, diglycidyl ether, glycidyl ether of glycerol and the like, and mixtures thereof.

Other materials may also be added to the composition as desired. This includes other types of polyepoxides such as described in U.S. 2,633,458. This also includes fillers, as sand, rocks, resin particles, graphite, asbestos, glass or metal oxide fibers, and the like, plasticizers, stabilizers asphalts, tars, resins, insecticides, fungicides, anti-oxidants, pigments, stains and the like.

The temperature employed in the cure will vary depending chiefly on the type of curing agent. The amino-containing curing agents generally cure at or near room temperature and no heat need be applied. The acids, anhydrides, and melamine derivatives, on the other hand, generally require heat, such as temperatures ranging from 150° F. to about 400° F. Preferred temperatures range from about 200° F. to about 400° F. and more preferably from about 250° F. to 350° F.

The compositions containing the polyepoxides and curing agents may be used for a variety of important applications. They may be used, for example, as adhesives for metal, wood, concrete, plaster and the like, and as surface coatings for various types of surfaces. The new compositions may also be used in the preparation of laminates or resinous particles reinforced with fibrous textiles. They may also be used in the formation of castings and molding and for the encapsulation of electrical equipment.

To illustrate the manner in which the invention may be carried out, the following examples are given. It is to be understood, however, that the examples are for the purpose of illustration and that the invention is not to be regarded as limited to any of the specific conditions or reactants recited therein. Unless otherwise indicated, parts described in the examples are parts by weight. The polyepoxides referred to by letter are those in U.S. 2,633,458.

EXAMPLE I

This example illustrates the reaction of diglycidyl ether of 2,2-bis(4-hydroxyphenyl)propane with phenol in the presence of methyl triphenyl phosphonium iodide.

10 parts of diglycidyl ether of 2,2-bis(4-hydroxyphenyl)propane was combined with 2.27 parts of phenol and 0.01 part of methyl triphenyl phosphonium iodide and the mixture kept at 150° C. for about 6 hours. Analysis indicated that the resulting product was:

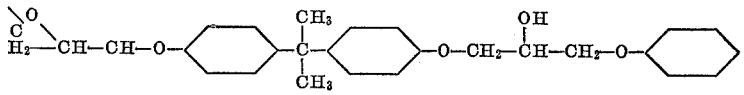

EXAMPLE II

Example I was repeated with the exception that the diglycidyl ether of 2,2-bis(4-hydroxyphenyl)propane was replaced by phenylglycidyl ether. Analysis indicated that the resulting product was:

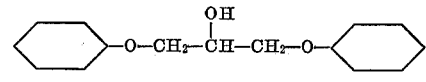

EXAMPLE III 3667 pounds of diglycidyl ether of 2,2-bis(4-hydroxyphenyl)propane and 1130 pounds of 2,2-bis(4-hydroxyphenyl)propane were mixed with 3.8 pounds of ethyl triphenyl phosphonium iodide and charged to a 1700 gallon jacketed, stirred reaction kettle. The contents were heated to 125° C., allowed to exotherm to 185° C., and then cooled back to 175° C., and held for a period of 30 minutes (including the initial exotherm period). The mixture was then cooled to give a frangible solid which had an epoxide equivalent of 515, was readily soluble in a mixture of xylene and methyl isobutyl ketone, and had a Gardner color of 2–3.

EXAMPLE IV

This example illustrates the use of the process in making an intermediate molecular weight polyepoxide from a mixture of Polyether A, bisphenol A, and tetrabromobisphenol A.

64 parts of Polyether A, 33 parts of tetrabromobisphenol A, 3 parts of bisphenol A, and 0.08 part of ethyltriphenyl phosphonium iodide were charged to a jacketed, stirred reaction kettle and blanketed with nitrogen. The contents were heated to 120° C. and then allowed to exotherm to 170° C. The mixture was maintained at this temperature for 1.5 hours and then cooled to give a frangible solid melting about 75° C. and readily soluble in acetone. The epoxy content of the product was 0.194 eq./100 g. The theoretical epoxy content, assuming no side reactions had taken place, would also be 0.194 eq./100 g.

100 parts of the above-described solid were combined with 4 parts of dicyandiamide and heated to 175° C. The resulting product was a hard insoluble infusible resin.

Essentially identical experiments were run in which the phosphonium salt was replaced with either sodium carbonate or triethylamine. In the case of the sodium carbonate catalyzed material it was necessary to filter the hot viscous material at the completion of the desired reaction to remove the suspended catalyst and minimize continued undesirable reaction of the remaining epoxy groups with the alcoholic hydroxyl groups produced by the primary reaction. In the case of the triethylamine catalyst materials it was necessary to apply a vacuum at the completion of the primary reaction to remove the catalyst and minimize further reaction.

The following table gives the analyses on the above products and clearly shows the efficacy of the phosphonium salt as compared to the two conventional catalysts in minimizing side reactions.

| Catalyst Used | Theor-epoxy content, eq./100 g. | Actual epoxy content, eq./100 g. |
|---|---|---|
| ETPPI | .272 | .275 |
| ETPPI | .250 | .244 |
| ETPPI | .218 | .217 |
| ETPPI | .218 | .216 |
| Na₂CO₃ | .218 | .210 |
| TEA | .234 | .198 |

EXAMPLE V 76.26 parts of Polyether A, 23.69 parts of bisphenol A, and .09 part of methyl triphenyl phosphonium bromide were combined and heated for 1 hour and 20 minutes in the range of 122–138° C. On cooling there resulted frangible soluble fusible solid with an epoxy content of .196 eq./100 g. Based on the analysis of the starting materials, the theoretical epoxy content of the product, assuming no side reactions, would be .195 eq./100 g.

EXAMPLE VI

This example illustrates the effect of storage upon the catalytic activity of the phosphonium salt. Mixtures of diglycidyl ether of 2,2-bis(4-hydroxyphenyl)propane with various catalysts were prepared, and stored at 50° C. for various periods as shown in the following table. After storage the mixtures were reacted with 2,2-bis(4-hydroxyphenyl)propane for 10 minutes at 163° C. and the epoxide content of the resulting products measured. The results show that the phosphonium salts retained their catalytic activity for several weeks, whereas in comparison a phosphine catalyst became noticeable more inactive. It should be noted that before each fusion reaction the epoxide content of the stored diglycidyl ether was measured; in all cases there was no loss of epoxide.

| Catalyst | Epoxide Content, m. eq./g., after storage at 50° C. for— | | |
|---|---|---|---|
| | Initial | 2 weeks | 4 weeks |
| None | 4.0 | 4.1 | 4.1 |
| Triphenylphosphine.C₂H₅I | 2.3 | 2.0 | 2.1 |
| Triphenylphosphine.C₂H₅Br | 2.2 | | 2.3 |
| Triphenylphosphine.C₄H₉I | 2.0 | | 2.0 |
| Ttripenylphosphine.CH₃I | 2.0 | | 2.1 |
| Triphenylphosphine.C₂H₅Cl | 2.1 | | 2.7 |
| Triphenylphosphine | 3.3 | 3.8 | 3.8 |

NB=The theoretical m. eq./g. at 0% reaction=4.00; at 100% reaction=2.00.

EXAMPLE VII

Example III was repeated with the exception that butyl triphenyl phosphonium iodide was used as a catalyst. Related results were obtained.

EXAMPLE VIII

This example illustrates the use or the process in making phenolic terminated resins from a polyepoxide and a polyphenol by starting with a molar excess of phenolic groups.

10.29 parts of Polyether A, 8.49 parts of 2,2-bis(4-hydroxyphenyl)propane and .019 part of ethyltriphenyl phosphonium iodide were charged to a jacketed, stirred reaction kettle and blanketed with nitrogen. The contents were heated to 120° C. and then allowed to exotherm to 180° C. After cooling a soluble frangible solid was obtained having a phenolic hydroxyl content of .082 eq./100 g. Based on analyses of the reactants the theoretical phenolic content, in the absence of side reactions, would be .080 eq./100 g.

EXAMPLE IX

The example illustrates the use of the process in making a high molecular weight thermoplastic.

11.4 g. of 2,2-bis(4-hydroxyphenyl)propane, 16.9 g. of the purified diglycidyl ether of 2,2-bis(4-hydroxyphenyl) propane and .16 g. of ethyltriphenylphosphonium iodide were mixed together in a soil can, heated on a hot plate to 200° C. and allowed to cool slowly. The resulting material was a clear, very tough resin with an intrinsic viscosity in 1,2-dimethoxyethane of 0.4 dl./g.

We claim as our invention:

1. A process comprising reacting an epoxide possessing more than one 1,2-epoxide group with a phenol in the presence of a hydrocarbon phosphonium halide catalyst.

2. A process comprising reacting a polyepoxide possessing more than one 1,2-epoxide group with a phenol in the presence of a hydrocarbon phosphonium halide catalyst.

3. A process as in claim 2 wherein the penol is a polyhydric phenol.

4. A process as in claim 2 wherein the polyepoxide is a glycidyl polyether of a polyhydric phenol.

5. A process as in claim 2 wherein the phosphonium halide has the formula

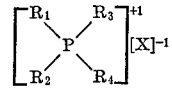

wherein X is a halogen atom, and R₁, R₂, R₃ and R₄ are the same or different and represent hydrocarbon radicals containing from 1 to 18 carbon atoms, which may be substituted by halogen atoms.

6. A process as in claim 2 wherein the phosphonium halide is ethyl triphenyl phosphonium iodide.

7. A process as in claim 2 wherein the phosphonium halide is methyl triphenyl phosphonium bromide.

8. A process as in claim 2 wherein the phosphonium halide is methyl triphenyl phosphonium iodide.

9. A process as in claim 2 wherein the polyepoxide is a glycidyl polyether of a polyhydric phenol and the phenol is tetrabrominated 2,2-bis(4-hydroxyphenyl) propane.

10. A process as in claim 2 wherein the amount of the phosphonium halide varies from about 0.001% to about 10% by weight.

11. A process for the preparation of essentially linear, ketone-soluble epoxy resins of high molecular weight comprising reacting a polyepoxide possessing more than one 1,2-epoxide group and having a molecular weight below 1000 with a dihydric phenol in the presence of from 0.001% to about 10% by weight of a phosphonium halide catalyst having the general formula

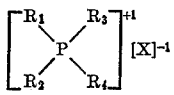

wherein $R_1$, $R_2$ and $R_3$ are phenyl radicals, $R_4$ is an alkyl radical of from about 1 to about 10 carbon atoms and X is a halogen atom.

12. A process as in claim 11 wherein the dihydric phenol is 2,2-bis(4-hydroxyphenyl)propane.

13. A stable composition comprising a polyepoxide possessing more than one 1,2-epoxide group and from about 0.001% to 10% by weight of a hydrocarbon phosphonium halide.

References Cited

UNITED STATES PATENTS 2,506,486   5/1950   Bender et al.

WILLIAM H. SHORT, Primary Examiner

T. PERTILLA, Assistant Examiner

U.S. Cl. X.R.

260—2, 348, 51, 88.3, 613, 615